Jan. 5, 1965    M. A. BLOUIN    3,164,691
SELECTIVE ELECTRICAL PROGRAMMING DEVICE
Filed May 31, 1961    3 Sheets-Sheet 1
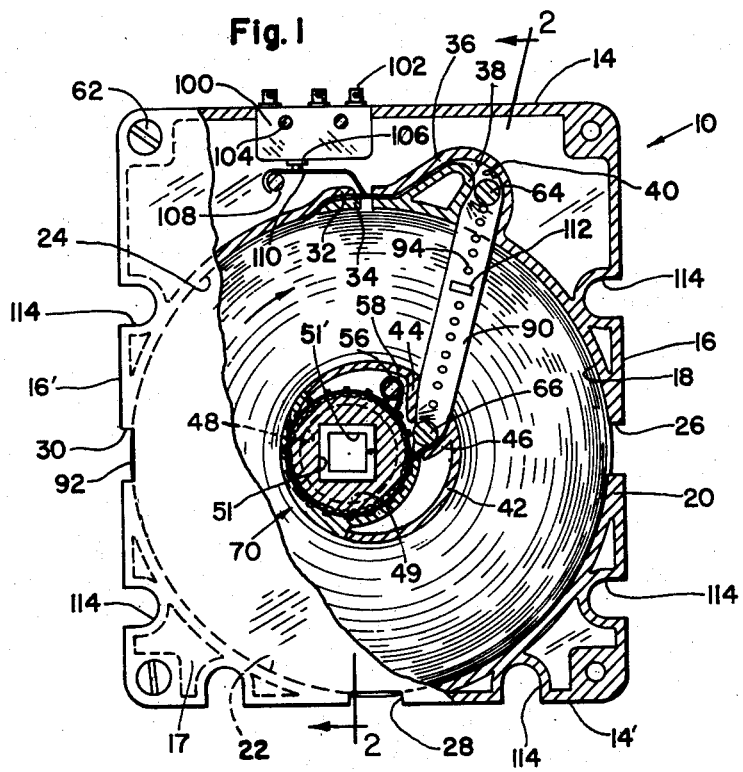
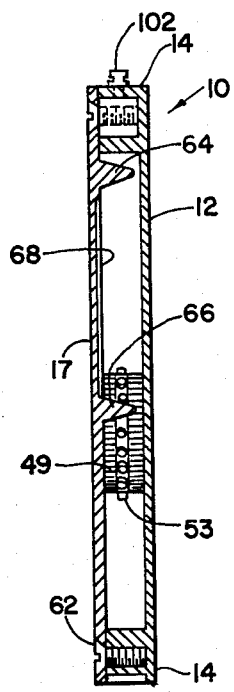
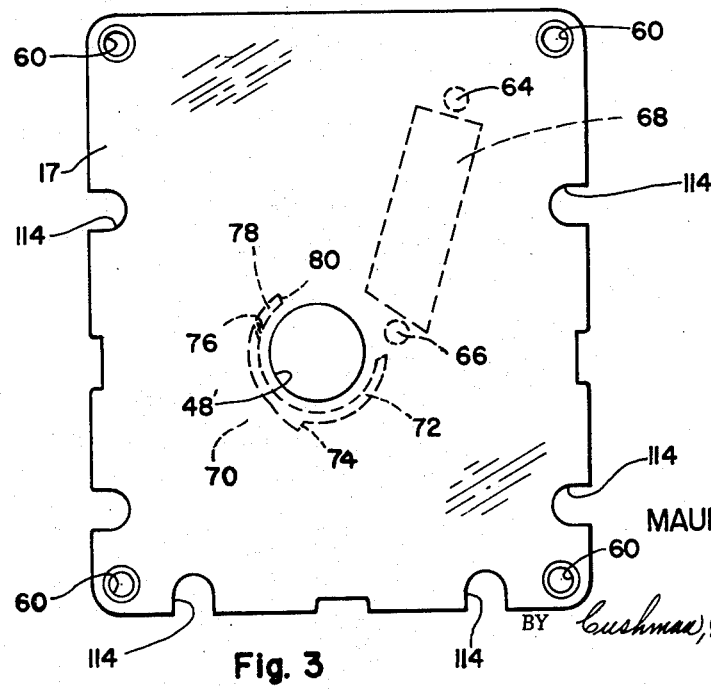
INVENTOR
MAURICE A. BLOUIN
BY Cushman, Darby & Cushman
ATTORNEYS Jan. 5, 1965     M. A. BLOUIN     3,164,691
SELECTIVE ELECTRICAL PROGRAMMING DEVICE
Filed May 31, 1961     3 Sheets-Sheet 2

INVENTOR
MAURICE A. BLOUIN
BY Cushman, Darby & Cushman
ATTORNEYS

Jan. 5, 1965 M. A. BLOUIN 3,164,691
SELECTIVE ELECTRICAL PROGRAMMING DEVICE
Filed May 31, 1961 3 Sheets-Sheet 3

INVENTOR
MAURICE A. BLOUIN
BY Cushman, Darby & Cushman
ATTORNEYS

United States Patent Office 3,164,691
Patented Jan. 5, 1965

3,164,691
SELECTIVE ELECTRICAL PROGRAMMING DEVICE
Maurice A. Blouin, P.O. Box 158, Gardner, Mass.
Filed May 31, 1961, Ser. No. 113,910
8 Claims. (Cl. 200—46)

This invention has reference to a device for programming a predetermined sequence of events and has particular reference to a new and improved selective electrical programming device for providing a predetermined sequence of output signals.

In control systems, there is generally provided a program device for establishing the programming routine to be followed. Such devices can be operatively installed at a centralized control station; or alternatively, at distributed stations in the system. Programming devices of this character may be operated by a predetermined time input, e.g. an input shaft rotating at a predetermined speed; or such alternative input signals as pressure, temperature, electrical circuit fluctuations or the like—all to provide desired output signals.

The prior art devices of this type are generally complex electro-mechanical structures, and in many instances provide for introducing and/or changing the sequence of output signals through tedious procedures.

It is accordingly, an object of this invention to obviate the shortcomings of the prior art by the provision of a selective electrical programming device having the attributes of small, simple and inexpensive construction, high-power capacity, extensive programming range, and a repeating cycle.

Another object of this invention is the provision of a new and improved programming device which includes a housing for carrying an endless roll of programming tape, means for guiding the tape from the outside to the inside of the roll, means for driving the tape, and means for reading the programming on the tape to provide output signals.

A further object of this invention is to provide an endless programmed tape roll carried in a housing of a simpler and more compact construction than heretofore known in the art. The housing has (1) aperture adjacent to the outside edge of tape roll for changing the program sequence along the tape without removal of the entire tape roll from the housing; (2) integrally moulded posts and bosses for receiving the operating parts (3) an improved geometric construction for guiding the endless tape and may be transparent so that structure, operation and tape indicia may be observed.

A still further object of this invention is to provide a programming device having a thin, stiff, strong and dimensionally stable programming tape, the tape being an endless roll to provide repeat program cycling, and being of a geometry, and guidance such that far greater numbers of programming stations for the size device are now attainable. When cooperating with a sprocket wheel drive according to this invention, the sprocket holes carried by the tape are at precise locations for potential programming holes, the programming holes not adversely affecting the tape drive operation. The tape carries simple program identification indicia; the tape may be programmed by punch or spotting means and may be deprogrammed by means of precut card mounted adhesive patch tabs, or the like.

Another object of this invention is to provide an endless programmed tape roll in a housing with drive means rotatably mounted in the central portion of both the housing and tape roll. The drive means comprises a sprocket wheel cooperating with tape sprocket holes, thus providing positive and efficient tape drive, the sprocket wheel being positioned relative to a readout means so as to eliminate tape slack and allow perfect synchronization of tandem program devices. The sprocket wheel is located in axially offset relationship to the inside of tape roll to provide pushing force to effectively drive the tape from the outside to the inside of the tape roll, the housing having a lock pawl cooperating with the sprocket wheel to provide unidirectional drive. The sprocket wheel further has a polygonal shaped drive hole requiring no other fastening to a drive shaft, and is adaptable to be driven by timers, impulsers, stepping switches, ratchet relays, solenoids, servo-devices, and the like.

Still another object of this invention is to provide an endless programmed tape roll carried in a housing having positive tape drive means and tape guidance means comprising rollers or guide posts of a peculiar geometric configuration, providing a tape drive action having minimum friction to unwind the tape from the outside to the inside of the roll, and to change the plane of the tape so as to lie flat as it moves across the roll surface.

A still further object of this invention is to provide an endless programmed tape roll in a housing, positive tape drive means, guide means to carry tape from outside to inside of roll and program readout means carried by the housing which are actuated only by slots or apertures of different size than tape sprocket hole, to provide an output for use in an electrical circuit. The readout means is of high-power capacity such as a micro-switch for use in electric load circuits in business machines, data and processing systems, displays, toys, home program units, time recorders, industrial controls, institutional signaling systems, communication systems, telemetering systems, space equipment, servo systems, instruments and the like in the control systems field.

Yet a further object of this invention is to provide an endless programmed tape roll in a housing with positive tape drive means, improved tape guide means, means for reading the tape program, and means of interchanging tandem program devices by a snapclip mechanical connector.

Still further objects, novel features and advantages of this invention will become apparent in the specification, claims, and accompanying drawings wherein:

FIGURE 1 is a plan view partially in section showing the device according to this invention;

FIGURE 2 is a partial elevation view taken substantially along lines 2—2 in FIGURE 1;

FIGURE 3 is a plan view of the top plate in FIGURE 1;

Figure 4:
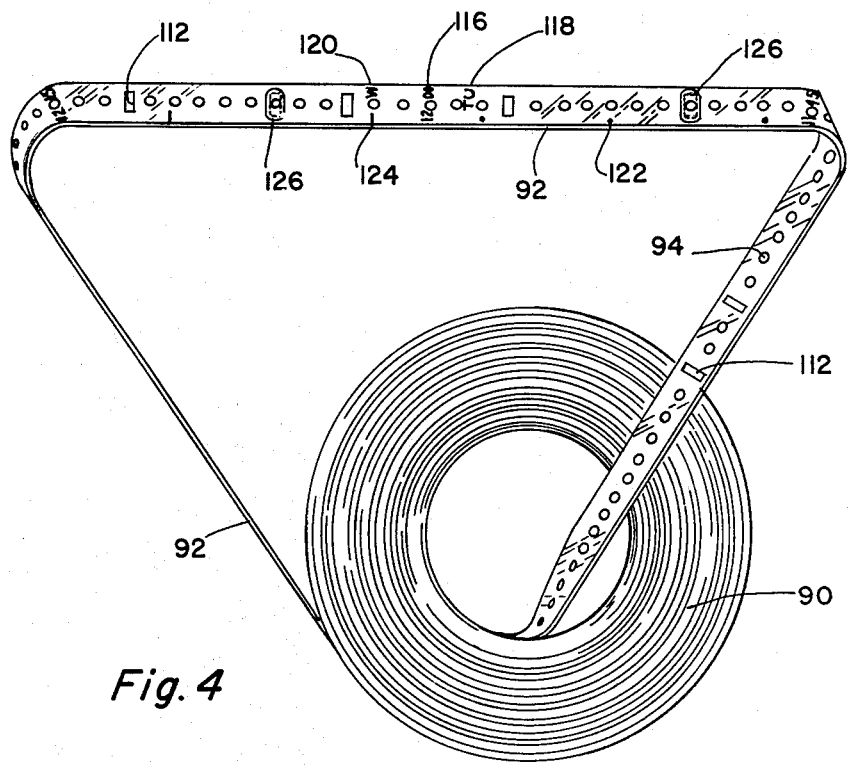
FIGURE 4 is a view of a weekly programming tape according to this invention.

Reference is now made to the accompanying drawings and particularly FIGURE 1, where there is shown a device embodying the features of this invention. There is shown a housing case 10 which includes a bottom wall 12, end walls 14, 14', side walls 16, 16'; and a top plate 17 joined to the housing case 10. Extending upwardly from the bottom wall 12 in a circular configuration are a plurality of outer guide channels 18, 20, 22, and 24. There is also provided an apertture 26 in the side wall 16, an aperture 28 in the end wall 14', and an aperture 30 in the side wall 16' for reasons to be explained hereinafter.

Referring to the guide channel 24, there is provided an outwardly extending portion 32 and a cooperating guide post 34 inwardly adjacent thereto in spaced apart relationship. The guide post 34 is of a wedge-shaped construction, as shown in FIGURE 1. There are also provided cooperating guide members 36 and 38 in co-extensive spaced apart relationship relative to the guide member 32 and the guide post 34, respectively. The members 36 and 38 extend outwardly from the channel 18 and then inwardly defining a smoothly curved passage therebetween. The members 36 and 38 then diverge outwardly relative to each other to provide an enlarged recess 40 adjacent to guide channel 18.

Disposed concentric with the configuration of the outer guide channels 18, 20, 22, and 24 is a concentric inner guide channel 42 which is in the form of an arc of the circle along its outside surface. Joined to the inner surface of the channel 42 are inwardly extending guide members 44 and 46, the member 46 preferably being curved as best shown in FIGURE 1.

The bottom wall has a round bearing aperture 48 therethrough in axially offset rotation to the common axis of the inner and outer guide channels, and the top plate 17 has an opposed bearing aperture 48' therethrough in alignment with the aperture 48.

Figure 8:
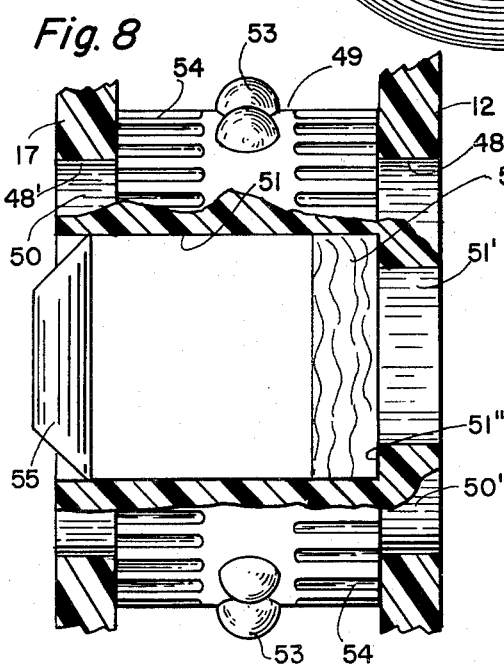
FIGURE 8 is an elevation view, partially broken out, showing the housing structure adjacent the sprocket drive means.

A sprocket wheel 49 is rotatably mounted within the housing case 10 by oppositely extending bosses 50, 50' engaged in the apertures 48, 48' respectively, as best shown in FIGURE 8.

The sprocket wheel 49 has a large square passage 51 communicating with a small square passage 51' to afford an axial driving means therefor. One or more program units can be engaged onto and driven by a square drive shaft cooperating with the square passage 51'. Also, by means of a snapclip mechanical connector 55 in the passage 51 and the provision of a biasing spring 52 abutting the end wall 51". Thus the square tapered end of the connector 55 may engage the passage 51' of an adjacent programming device (not shown), thereby providing a quick interchanging drive for several tandem units.

The sprocket wheel 49 has a plurality of aligned sprocket pins 53 extending radially from the surface thereof, these sprocket pins 53 either being integrally molded with the sprocket wheel 49, or individual pins engaged in corresponding holes, as is apparent. The circumferential end regions of the sprocket wheel have axially spaced apart grooves or serrations 54 therealong, as best shown in FIGURES 2 and 8.

Extending upwardly from the bottom surface 12 of the housing case 10 is a post 56 carrying a pawl 58 enggaging the serrated surface 54 of the sprocket wheel 49. This cooperative arrangement of the pawl 58 with the serrated surface 54 permits movement of the sprocket wheel 49 in one direction only, this being clockwise in FIGURE 1.

Turning now to FIGURE 3; the cover plate 17 is shown removed from the housing case 10. The cover plate 17 has countersunk apertures 60 at the four corners, which receive cooperating machine screws 62, the machine screws 62 being received in the corner bosses of the case 10 to hold the cover plate 17 in proper engagement with the housing case 10.

The cover plate 17 has a first conical guide post 64 which extends into the recess 40 defined by the members 36 and 38, and a second conical guide post 66 which extends into the recess defined by the guide members 44 and 46. Additionally, the bottom surface of the cover plate 17 has a recessed guide track 68 extending from the first guide post 64 to the second guide post 66. In this regard, the recessed track 68 provides a space between the upper surface of the guide channel 18 which is disposed adjacent thereto; and, in a like manner, a space between the upper surface of the inner guide channel 42. Also extending inwardly from the bottom surface of the top plate 17 is a cooperating guide member 70. The member 70 includes a first portion 72 of circular configuration which extends from the inner end of the guide member 46 to one end of the inner guide channel 42, the first portion 72 having an abutment 74 extending outwardly therefrom for engagement with one end of the channel 42 (FIGURE 1). In this regard, the inner surface of the first portion 72 is so curved to conform to the outer surface of the sprocket wheel 49 in spaced apart relationship. The first portion 72 thence extends about the sprocket wheel 49 through an arc about 180°, then terminating in an outwardly diverging end portion 76. Disposed adjacent the end portion 76 in spaced apart relationship is a second portion 78 having a cooperative wedge-shaped configuration adjacent the end portion 76. The opposite end 80 of the second portion 78 engages the end of the inner guide channel 42, as shown in FIGURE 1. Thus, the outside surface of the inner guide channel 42 together with the outside surface of the cooperating guide members 70 defines a circular surface which is concentric with the inner surface of the outer guide channels 18, 20, 22 and 24.

There is mounted on the outside surface of the inner guide channel 42 and the guide member 70 an endless roll of programming tape 90 which is disposed as follows: the outer loop or portion 92 of the tape 90 passes adjacent the apertures 26, 28, and 30, thence along the outer guide channel 24 and between the members 32 and 34. The tape then passes between the members 36 and 38 and slides against the first conical guide post 64 which is disposed in the recess 40. By virtue of the arrangement of the members 36 and 38, together with the first conical guide post 64, the lay of the tape is changed from its normally perpendicular arrangement relative to the bottom wall 12 to a parallel arrangement thereto. The tape then passes across the top of the roll 90 within the track 68 and then partially about the second conical guide member 66. The tape then passes along the inner side of the cooperating guide member 70 adjacent the sprocket pins 53 and between the end portion 76 of the first portion 72 and the second portion 78, then onto the inside of the roll of tape.

By virtue of the arrangement of the outwardly diverging members 36 and 38 together with the angular relationship of the member 46 which guides the tape along the side of the second conical post 66 onto the sprocket wheel, the particular arrangement of the end portion 76 with the second portion 78, and the offset tape drive, axially; there is provided a geometrically smooth path for movement of the tape 90.

The tape 90 has regularly spaced sprocket holes 94 mounted therealong; the sprocket holes engaging the pins 53 on the sprocket wheel 49 during rotation of the sprocket wheel 49. The tape 90 is necessarily of a dimensionally stable construction which is capable of withstanding compressive force, i.e., as the tape 90 is unwound from the outer portion of the roll and wound onto the inner portion, this motion must be transmitted throughout the roll so that the outer position moves a corresponding distance. Accordingly, the tape must also have a surface which has a relatively low coefficient of friction in order that there may be an unhampered sliding movement between the adjacent tape surfaces.

The tape material has elasticity in the bend direction and energy is stored in each coil turn; because of this each coil exerts an outward force which tends to unwind or open up the coil and to press against the outside perimeter of the coil recess. Thus, the inside winding arrangement provides relief of the tape push-force which allows proper operation. Such arrangements for winding the tape onto the outside of the coil do not operate as efficiently as the required push-force would be excessive.

By way of example a polyester resin tape material as manufactured under the Dupont trademark of "Mylar" has proven quite successful, and a tape thickness of .005 in. has provided a very compact structure wherein the housing case 10 is of a minimum size which leads such a structure to miniaturization and the like.

Mounted in the housing case 10 adjacent the side wall 14 is a single pole; double throw microswitch 100 of conventional construction. The microswitch 100 has electrical conductor posts 102 conveniently extending therefrom and is mounted in the housing case 10 as by mounting posts 104. The microswitch 100 is actuated by a lever pin 106 operable for movement between an inner position and an outer position wherein the microswitch circuit is actuated and deactuated. A post 108 extends upwardly from the bottom wall 12 of the housing case 10 and receives a downwardly biased elongated reading member 110 which abuts the bottom surface of the pin 106, as best shown in FIGURE 1. The reading member 110 is of a rectangular cross-sectional configuration; thus, if the tape 90 is moved past the bottom surface of the reading member 110, the position of the member 110 (and the lever pin 106) is unchanged; as the programming tape 90 merely slides therealong. As is apparent, the sprocket holes 94 in the tape will have no effect on the position of the reading member 110 simply because the sprocket holes are smaller than the end surface of the lever member 110. However, when program slots 112 pass adjacent the end of the reading member 110, the reading member 110 will drop into the programming slots 112, thereby actuating the microswitch 100 through the responsive downward movement of the switch pin 106. The microswitch circuit is thereby transferred and an output signal is provided when the microswitch 100 is properly connected in an electrical circuit. As the tape 90 continues to move past the bottom surface of the reading member 110 it is thus apparent that the microswitch 100 will only be actuated when a programming slot 112 is encountered.

In this regard, the width of the generally rectangular programming slots 112 in the programming tape 90 is the same as the diameter of the sprocket holes 94 so that the sprocket teeth 53 will drive the tape regardless of whether a circular or rectangular hole is encountered.

There is conveniently provided along the side walls 16, 14′ and 16′ of the housing case 10, recessed portions 114 which may conveniently receive screws or the like when the top plate 17 is mounted adjoining flat surfaces, thereby preventing movement of the housing case 10 when the sprocket wheel 49 is driven by a shaft.

Figure 5:
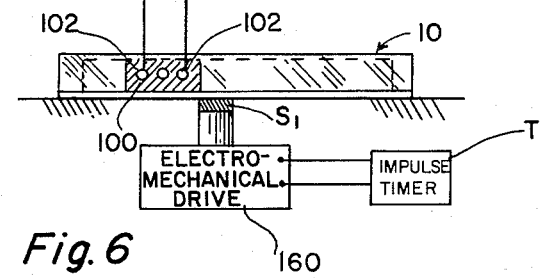
FIGURE 5 is an enlarged view of a portion of the tape shown in FIGURE 4.
Figure 7:
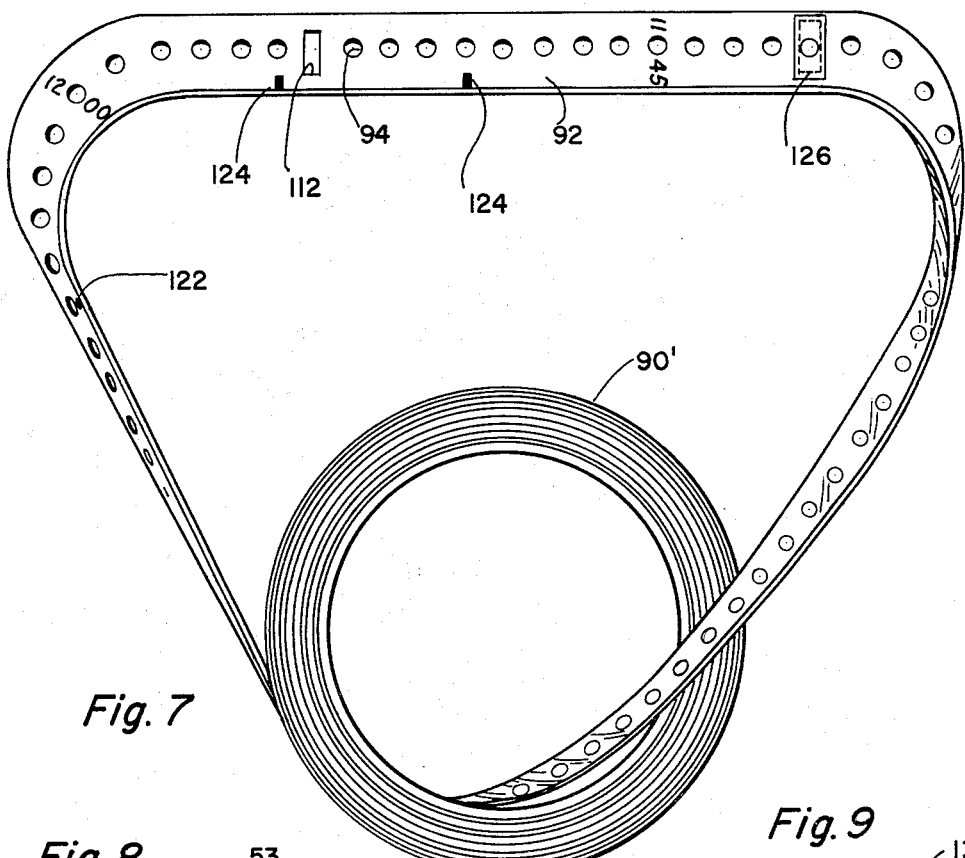
FIGURE 7 is a view similar to FIGURE 4, but showing an enlarged view of a daily programming tape according to this invention.

Turning now to FIGURES 4 and 5, a weekly programming tape 90 is shown removed from the housing case 10, and in FIGURE 7, a corresponding daily programming tape 90′ is shown (greatly enlarged). The programming tape 90 conveniently has the sprocket holes 94 spaced apart at regular intervals. The preference for a "daily" or "weekly" programming cycle depends on the requirements of the specific environment in which the device 10 is to be used. The "daily" tape may be provided with, e.g., 1440 sprocket holes, corresponding to the number of minutes in a day; and, likewise providing a potential programming station at every one-minute interval, as will become evident. Likewise, the "weekly" tape may have, e.g., 10,080 sprocket holes; providing potential one-minute programming intervals throughout the week, as is apparent.

Other time cycles, of course, may be used, as well as other potential programming intervals. By such an arrangement the programming tape 90 thereby provides programming intervals for actuation of the microswitch 100 when driven at the proper rate by a rotating shaft. Thus, to provide, for example, a daily or weekly sequence of programming events, suitable programming slots 112 may be punched in the programming tape at positions where it is desired to actuate an electric circuit or the like through the microswitch 100.

There is provided along the surface of the programming tape 90 suitable indicia to facilitate the programming operation. To this end there is shown in FIGURE 4 the numeral 116 designating the time "12:00 o'clock".

In a like manner, indicia 118 indicates "Tuesday" while indicia 120 indicates "Wednesday". The dots 122 indicate "p.m." and the dashes 124 indicate "a.m." The time 116 may be placed along the tape at 15 minute intervals, as desired.

In order to change a programming station; i.e., change a program slot 112 to a circular sprocket hole 94, a patch tab 126 having an adhesive surface is placed on the tape 90 over the program slot 112, the patch tab 126 having sprocket hole 94 therethrough. Alternatively a programming slot 112 covered by a tab 126 may be reused simply by peeling off the tab 126 from the tape 90.

In a like manner, when it is desired to add a programming station, i.e., change a circular sprocket hole 94 to a programming slot 112; the tape 90 may be conveniently pulled from any of the apertures 26, 28, 30 at their position along the tape 90 where the change is desired, and a rectangular hole punched in the tape.

Figure 9:
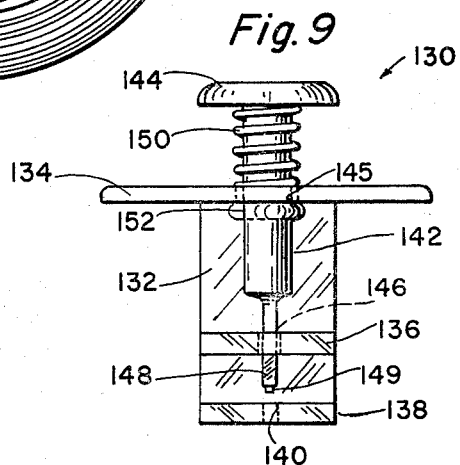
FIGURE 9 is a punch mechanism for changing the programming sequence on the tape shown in FIGURES 4 and 7.

As shown in FIGURE 9, an exemplary punch 130 is shown for punching programming slot 112 in the tape 90.

The punch 130 includes upstanding frame 132 carrying a transverse plate 134, for engagement with a person's hand, a guide plate 136, and a bed plate 138 having a hole 140 therein. A punch shaft 142 having a thumb cap 144 is carried in an aperture 145 in the transverse plate 134 and an aperture 146 in the guide plate 136. The punch shaft 142 is in alignment with the hole 140 and carries a cooperating rectangular punch end 148 and a circular guide tip 149, for cooperation therewith. A compressive spring 150 is carried about the punch shaft 142 between the transverse plate 134 and the thumb cap 144; and a suitable lug ring 152 is carried on the punch shaft 142 adjacent the lower side of the transverse plate 134 to limit the upward movement of the punch shaft 142 by the spring 150.

Thus, as stated, to change a sprocket hole 94 on the tape 90 to a program slot 112, a person has but to manually rotate the sprocket wheel 49 until the desired position on the tape 90 is reached, as indicated by the various indicia carried thereby. The outer loop of the tape 90 at this point to be changed is then pulled out of one of the apertures 26, 28, 30 in the housing case 10. The person then slips the bed plate 138 under this tape and aligns the desired sprocket hole 94 with the recess 140 in the bed plate 138. The punch shaft 142 is pushed toward the aligned recess 140, the punch guide tip 149 at the end of the rectangular portion 148 of the punch enters the sprocket hole 94 and rectangular portion 148 punches a programming slot 112 in the tape 90, as is apparent.

Preferably the housing case 10 and related guide channels, etc., are a unitary structure, such as a transparent integrally molded plastic material, the top plate 17 being of a similar construction.

Figure 6:
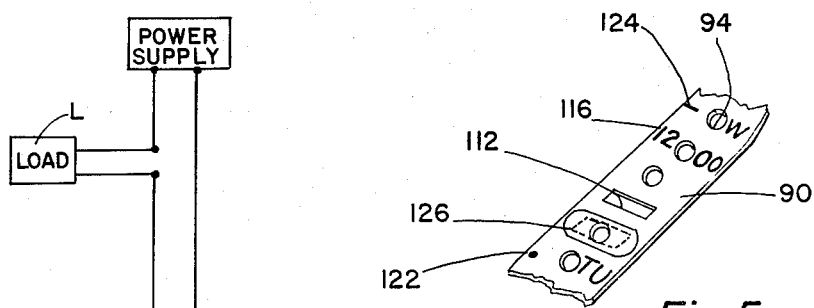
FIGURE 6 is a diagrammatic view of a device according to this invention in an electrical circuit.

Turning now to FIGURE 6, there is diagrammatically shown an exemplary time base programming system utilizing the device according to this invention. The shaft $S_1$ (and the sprocket wheel 49) is advanced at predetermined intervals, e.g., one minute, by any suitable electromechanical drives 160 which are well known in the art.

For example, a well-known solenoid actuated ratchet and pawl linkage has proven quite successful; this drive being controlled by any appropriate circuit closing timer T.

The conductor posts 102 of the microswitch 100 are connected to a source of electrical power, and to appropriate electrical loads L to be actuated in accordance with the sequence of signals (programming slots 112) on the roll of programming tape 90. Thus, as the shaft $S_1$ drives the tape 90 through the sprocket 49, the microswitch 100 will be actuated when the reading member 110 drops into a programming slot 112 in the tape 90.

In summary the disclosed embodiment consists of a thin and narrow program tape which is spliced in an endless coil and encased in a transparent plastic housing in such manner that it can be driven around by a small sprocket placed inside of the coil, whose pins engage prepunched holes in the tape. The tape unwinds on the outside and rewinds on the inside and an outer loop passes under the tip of a program sensing lever which operates a small snap-action switch when it encounters a program hole punched in the tape. The tape can be driven in only one direction as a lock pawl acting on the sprocket prevents reverse rotation. The tape can be programmed before assembly, or after assembly simply by withdrawing some outer loop through one of the housing openings and punching a program hole at the desired spot with a suitable hand punch. The withdrawn loop can be reinserted by turning the outer loop backwards with the tip of a pencil. The tape can be deprogrammed in like manner by carefully placing a precut adhesive tab over a programmed hole. While program tapes can be changed by removing the program unit, unscrewing the cover, removing the contained coil and inserting the new tape coil.

As will be appreciated, a plurality of such devices can be operatively driven from a common shaft or with snap clip mechanical connectors as described. Also, the circular configuration of the sprocket holes 94 relative to the generally rectangular programming slots 112 may be varied without departing from the scope of this invention, as suitable alternative geometrical variations will be apparent to those skilled in the art. It will thus be seen that the objects of this invention, together with many practical advantages, are successfully achieved.

Likewise, while the preferred embodiment of this invention is disclosed, alternative programming means will be apparent. For instance, in place of programming slots 112 and the microswitch reading means 100, there may be provided electrically conductive portions adapted to contact electric brushes; transparent or light receiving portions together with a photoelectric reading means; magnetic programming stations, cooperating with magnetic detection means; radioisotope programming means cooperating with radiation detection means, and the like.

As various possible embodiments may be made of the mechanical features of this invention, all without departing from the scope thereof, it is to be understood that all matters herein set forth and shown in the accompanying drawings are to be interpreted as an illustrative, and not in a limiting sense.

What is claimed is:

1. A selective electrical program device comprising: an endless roll of program tape with an outer loop and program means disposed therealong in predetermined pattern; housing means with tape-roll recess and tape guidances that guide said program tape from the outer turn past a program readout means thence across the roll surface and adjacent to an arc of a tape drive wheel on to the inner turn of said roll; said tape drive wheel placed within said roll and rotatably mounted in said housing for moving said tape in its endless cycles; and said program readout means, carried in said housing means adjacent to said outer loop, that is used to detect and convert said program means to electric signals.

2. A selective electric program device comprising: an endless roll of program tape with an outer loop and a line of program holes disposed therealong in predetermined pattern; housing means with tape-roll recess and tape guidances that guide said program tape from the outer turn past a program sensing lever thence across the roll surface and adjacent to an arc of a tape drive wheel on to the inner turn of said roll; said tape drive wheel placed within said roll and rotatably mounted in said housing means for moving said tape in its endless cycle; and said program sensing lever pivotally mounted in said housing adjacent to said outer loop for detection of said program holes and to operate an electric switch, also contained in said housing, that is used to convert said program means to electric signals.

3. A selective electric program device comprising: an endless roll of program tape with an outer loop, sprocket holes evenly spaced therealong and program means disposed therealong in predetermined pattern; housing means with tape-roll recess and tape guidances to guide said program tape from the outer turn of said roll past a program readout means thence across the roll surface and adjacent to an arc of a tape drive sprocket on to the inner turn of a roll; a tape drive sprocket placed within said roll and rotatably mounted to said housing means for moving said tape in its endless cycle; and said program readout means, carried in said housing adjacent to said outer loop, for detection of said program means and used to convert said program means to electric signals.

4. A selective electrical program device comprising: an endless roll of program tape with an outer loop, sprocket holes even spaced therealong and a line of program holes disposed therealong in predetermined pattern; housing means with tape-roll recess and tape guidances to guide said program tape from the outer turn past a program sensing lever thence across said roll wall and adjacent to an arc of a tape drive sprocket wheel thence on to the inner turn of said roll; said tape drive sprocket placed within said roll and rotatably mounted to said housing means for moving said tape in its endless cycle; and said program sensing lever, pivotally mounted in said housing adjacent to said outer loop, for detection of said program holes and to operate an electric switch, also contained in said housing means, that is used to convert said program holes to electric signals.

5. A selective electrical program device comprising: an endless roll of program tape with an outer loop, sprocket holes evenly spaced therealong and program holes disposed therealong at selected sprocket hole spots; housing means with tape-roll recess and tape guidances that direct said program tape from the outer turn of said roll past a program sensing lever thence across the roll surface and adjacent to an arc of a tape drive sprocket wheel thence on to the inner turn of said roll; said tape drive sprocket placed within said roll and rotatably mounted to said housing means for moving said tape in its endless cycle; and said program sensing lever, pivotally mounted in said housing adjacent to said outer loop, for detection of said program holes and to operate an electric switch, also contained in said housing means, that is used to convert said program holes to electric signals.

6. A selective program device comprising an endless roll of program tape with an outer loop, round sprocket holes evenly spaced along the center line, crosswise rectangular program holes disposed along the tape at selected sprocket hole spots, said program holes having a width equal to the diameter of the sprocket holes and a length substantially greater than said diameter; case-cover housing means with tape roll recess and tape guidances that direct said program tape from the outer turn of said roll past a program sensing lever thence across the roll surface and adjacent an arc of a tape drive sprocket wheel thence on to the inner turn of said roll; said tape drive sprocket placed within said roll and rotatably mounted to said housing means for moving said tape in its endless cycle; and said program sensing lever, pivotally mounted in said housing adjacent said outer loop, for detection of said program holes and to operate an electric switch, also contained in said housing, that is used to convert said program holes to electric signals.

7. A selective electrical program device comprising: an endless roll of program tape with an outer loop, round sprocket holes evenly spaced along the center line, crosswise rectangular program holes disposed along the tape at selected sprocket hole spots, said program holes having a width equal to the diameter of the sprocket holes and a length substantially greater than said diameter; a case-cover housing means with tape-roll recess and tape guidances that direct said program tape from the outer turn of said roll past a program sensing lever thence across the roll surface and adjacent an arc of a tape drive sprocket wheel thence on to the inner turn of said roll; said tape drive sprocket placed within said roll and rotatably mounted to said housing by means of bearing holes in said case and cover, said bearing holes being offset from the center of said roll, said sprocket also containing an axially located through-hole of square section, lateral grooves along its periphery and end bearings; a lock pawl and spring bias carried by said housing adjacent said sprocket to cooperate with said grooves to prevent reverse rotation; and said program sensing lever, pivotally mounted in said housing adjacent said outer loop, for detection of said program holes and to operate an electric switch, also contained in said housing, that is used to convert said program holes to electric signals.

8. A selective electrical program device comprising: an endless roll of program tape with an outer loop, round sprocket holes evenly spaced along the center line, crosswise rectangular program holes disposed therealong at selected sprocket hole spots, said program holes having a width equal to the diameter of the sprocket holes and a length substantially greater than said diameter, program indicia disposed along said tape and deprogram tabs negating program holes as needed; housing means comprising a case and cover, said case containing: a bottom plate with side and end walls, a doughnut-shaped tape-roll recess, a centrally located sprocket recess with an offset bearing hole, a recess and mounting for an electric switch and its cooperating program sensing lever, programming apertures in any of said side or end walls, tape guide walls to direct said program tape from the outer turn of said roll through an aperture in the outer roll wall past the tip of the sensing lever into a 90° twist for a flat pass over the roll surface into a reverse twist thence around an arc of a tape drive sprocket through an aperture in the inner roll wall and on to the inner turn of said roll, cover mounting holes, said cover containing: a top plate, cooperating tape guides including a parallel guide-wall segent around an arc of the drive sprocket, two conical tape guide posts cooperating in the 90° twisting of the tape, an opposed bearing hole and a tape relief track for said flat overpass; said tape drive sprocket placed within said roll and rotatably mounted to said housing by means of mating end bearings, said sprocket also containing an axially located through hole of square section and lateral grooves along its periphery; a lock pawl and spring bias carried by said housing adjacent said sprocket to cooperate with said grooves to prevent reverse rotation; and said program sensing lever pivotally mounted in said housing adjacent said outer loop, for detection of said program holes and to operate said enclosed snapaction electric switch, also contained in said housing but with accessible terminals, that is used to convert said program holes to electric signals.

References Cited in the file of this patent
UNITED STATES PATENTS

| | | |
|---|---|---|
| 3,002,061 | Perkins | Sept. 26, 1961 |
| 3,025,368 | Hibbard et al. | Mar. 13, 1962 |